US012771811B2

(12) United States Patent
Yokota et al.

(10) Patent No.: US 12,771,811 B2
(45) Date of Patent: Oct. 20, 2026

(54) ELECTRO-OPTICAL DEVICE AND ELECTRONIC APPARATUS

(71) Applicant: SEIKO EPSON CORPORATION, Tokyo (JP)

(72) Inventors: Tomoki Yokota, Suwa (JP); Kikuya Morita, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 494 days.

(21) Appl. No.: 18/190,984

(22) Filed: Mar. 28, 2023

(65) Prior Publication Data

US 2023/0308616 A1 Sep. 28, 2023

(30) Foreign Application Priority Data

Mar. 28, 2022 (JP) ................................ 2022-051310

(51) Int. Cl.
*H04N 9/31* (2006.01)
*G02F 1/1362* (2006.01)
*G02F 1/1368* (2006.01)

(52) U.S. Cl.
CPC ..... *H04N 9/3105* (2013.01); *G02F 1/136209* (2013.01); *G02F 1/136213* (2013.01); *G02F 1/136286* (2013.01); *G02F 1/1368* (2013.01)

(58) Field of Classification Search
CPC .................. G02F 1/00-397; H04N 9/31-3197
See application file for complete search history.

(56) References Cited

U.S. PATENT DOCUMENTS 5,753,549 A 5/1998 Lee
2005/0285988 A1* 12/2005 Nakagawa ........ G02F 1/136213 349/44
2007/0026632 A1 2/2007 Yamamoto
2007/0165147 A1* 7/2007 Kamijima ............ H10D 86/411 257/E27.113
2007/0182874 A1* 8/2007 Kamijima ............ G09G 3/3611 349/44
2018/0203314 A1 7/2018 Sugimoto

FOREIGN PATENT DOCUMENTS

JP H07249691 9/1995
JP H09191089 7/1997
JP 2000098409 4/2000
JP 2003152086 5/2003
JP 2007035823 2/2007
JP 2015094880 5/2015
JP 2018116077 7/2018

* cited by examiner

*Primary Examiner* — Christopher A Lamb, II
(74) *Attorney, Agent, or Firm* — JCIPRNET

(57) ABSTRACT

An electro-optical device including a capacitance element, a first insulating film serving as an insulating film, and a scanning line serving as a light shielding film, is provided. The first insulating film covers the capacitance element and includes a concave portion serving as a recessed portion that reflects a shape of the capacitance element. The scanning line is provided along the concave portion. The concave portion includes a bottom surface having a curved surface shape. An electronic apparatus including the electro-optical device and a control unit configured to control an operation of the electro-optical device is also provided.

8 Claims, 20 Drawing Sheets

ELECTRO-OPTICAL DEVICE AND ELECTRONIC APPARATUS

The present application is based on, and claims priority from JP Application Serial Number 2022-051310, filed Mar. 28, 2022, the disclosure of which is hereby incorporated by reference herein in its entirety.

BACKGROUND

1. Technical Field

The present disclosure relates to an electro-optical device and an electronic apparatus.

2. Related Art

For example, an electro-optical device, such as a liquid crystal display device capable of changing optical characteristics for each of pixels, is used in an electronic device, such as a projector.

The electro-optical device described in JP-A-2015-94880 includes an element substrate, a counter substrate, and a liquid crystal layer sandwiched by these substrates. The element substrate includes a substrate, various wiring lines having light shielding properties such as a scanning line and a data line, a capacitance element, a transistor, and a pixel electrode.

In JP-A-2015-94880, the capacitance element is provided so as to cover the upper surface and side surfaces of a protruding portion protruding from the surface of the substrate. By providing the capacitance element so as to cover the upper surface and the side surfaces of the protruding portion, the electrostatic capacitance of the capacitance element can be increased. Further, the capacitance element, the scanning line, the transistor, and the data line are disposed on the substrate in this order from the side of the substrate. Light traveling from the substrate to the transistor is blocked by the scanning line provided between the substrate and the transistor.

The scanning line is provided on an interlayer insulating layer that fills a recessed portion between the protruding portions provided with the capacitance element. In the interlayer insulating layer, an indentation occurs, which reflects the recessed portion between the protruding portions provided with the capacitance element. Then, there is a problem that the indentation occurring in the interlayer insulating layer may cause a seam, a crack, a film formation unevenness, or the like, which result in a scanning line defect in the scanning line provided on the indentation, such as line breakage, high resistance, a deterioration in a light shielding performance or the like.

SUMMARY

An electro-optical device according to an aspect of the present disclosure includes a capacitance element, an insulating film covering the capacitance element and including a first recessed portion reflecting a shape of the capacitance element, and a light shielding film provided along the first recessed portion. The first recessed portion includes a bottom surface having a curved surface shape.

An electronic apparatus according to an aspect of the present disclosure includes the above-described electro-optical device, and a control unit configured to control an operation of the electro-optical device.

DESCRIPTION OF EXEMPLARY EMBODIMENTS

Exemplary embodiments of the present disclosure will be described below with reference to the accompanying drawings.

In each of the following drawings, the scales of members are caused to be different from those of actual members in order to be of a size for each of the members to be recognizable.

Further, for convenience of explanation, the description will be made using, as appropriate, an X-axis, a Y-axis, and a Z-axis, which are mutually orthogonal. Further, one direction along the X-axis is denoted as an X1 direction, and the direction opposite to the X1 direction is denoted as an X2 direction. Similarly, one direction along the Y-axis is denoted as a Y1 direction, and the direction opposite to the Y1 direction is denoted as a Y2 direction. One direction along the Z-axis is denoted as a Z1 direction, and the direction opposite to the Z1 direction is denoted as a Z2 direction. Note that, in the following description, an X direction, which is a second direction, is the X1 direction or the X2 direction. A Y direction, which is a first direction, is the Y1 direction or the Y2 direction. A Z direction is the Z1 direction or the Z2 direction.

Further, when a surface including the X-axis and the Y-axis is an XY plane, the XY plane being viewed in the Z1 direction or the Z2 direction will be referred to as plan view, or as being planar, and the XY plane being viewed from a vertical direction with respect to a cross-section including the Z-axis will be referred to as a cross-sectional view or as being cross-sectional.

Further, in the following description, notation of with respect to the substrate, or on the substrate, is intended to represent a case in which a member is disposed on top of the substrate in contact with the substrate, a case in which a member is disposed on the substrate with another structural element or the like interposed therebetween, or a case in which a member is disposed on the substrate such that a part thereof is in contact with the substrate and a part thereof is disposed with another element interposed therebetween.

1. Liquid Crystal Device

1A. Basic Configuration

Figure 1:
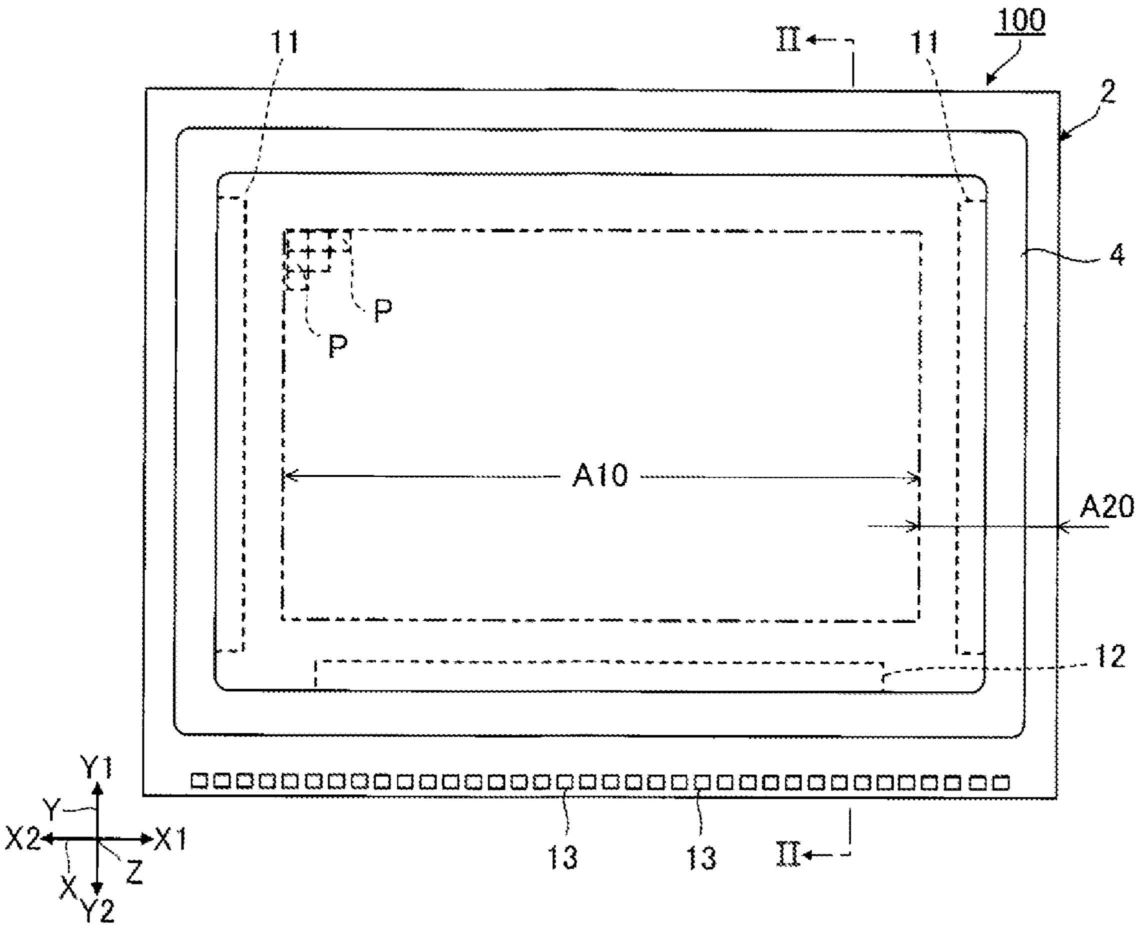
FIG. 1 is a plan view of a liquid crystal device according to an embodiment.
Figure 2:
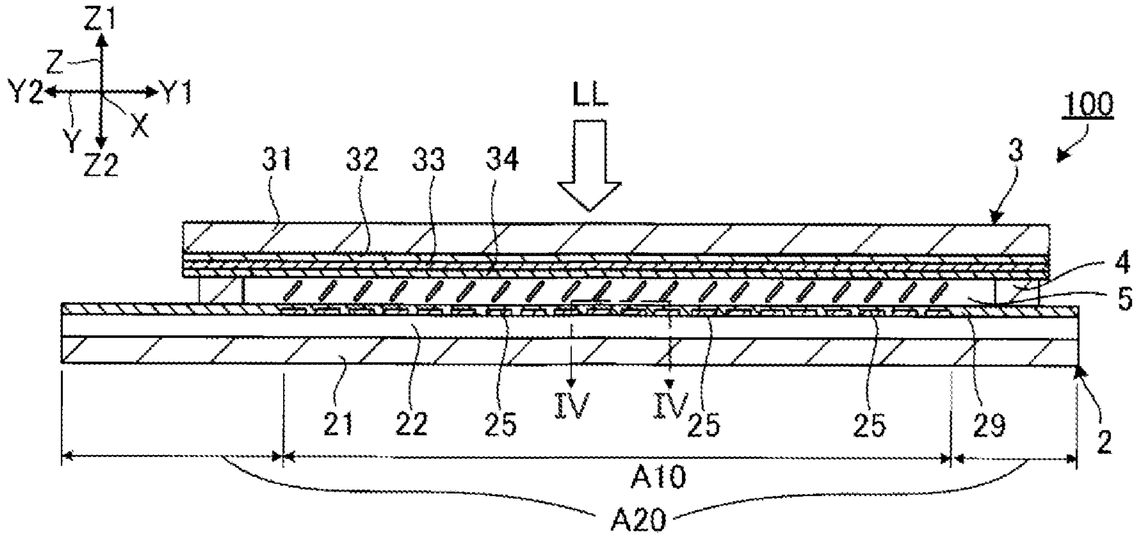
FIG. 2 is a cross-sectional view, taken along a line II-II, of the liquid crystal device illustrated in FIG. 1.

FIG. 1 is a plan view of a liquid crystal device according to an embodiment. FIG. 2 is a diagram schematically illustrating a cross section, taken along a line II-II, of the liquid crystal display device illustrated in FIG. 1. Note that, in FIG. 1, illustration of a counter substrate 3 is omitted.

A liquid crystal device 100 as an electro-optical device illustrated in FIG. 1 and FIG. 2 is a transmission type liquid crystal device driven by an active matrix. As illustrated in FIG. 2, the liquid crystal device 100 includes an element substrate 2, the counter substrate 3, a sealing member 4, and a liquid crystal layer 5 as an electro-optical layer. The element substrate 2, the liquid crystal layer 5, and the counter substrate 3 are aligned in the Z1 direction in this order. Further, as illustrated in FIG. 1, the shape of the liquid crystal device 100 in plan view is quadrangular, but may be circular.

As illustrated in FIG. 1, the liquid crystal device 100 includes a display region A10 that displays an image, and a peripheral region A20 located outside of the display region A10 in plan view. A plurality of pixels P are arrayed in a matrix pattern in the display area A10. Further, the peripheral region A20 is a region surrounding the display region A10 in plan view.

A scanning line drive circuit 11, a data line drive circuit 12, and a plurality of external terminals 13 are disposed in the peripheral region A20 of the element substrate 2. Some of the plurality of external terminals 13 are connected to the scanning line drive circuit 11 or the data line drive circuit 12 via wiring lines. Further, the plurality of external terminals 13 include terminals to which a common potential is applied.

The element substrate 2 is provided with a thin film transistor (TFT), as a transistor, to be described below. As illustrated in FIG. 2, the element substrate 2 includes a first substrate 21 as a transmissive insulating member, a transmissive stack body 22, transmissive pixel electrodes 25, and a transmissive first alignment film 29. Note that "transmissive" refers to transmittance with respect to visible light, and preferably means that transmittance of visible light is equal to or greater than 50%.

The first substrate 21, the stack body 22, the pixel electrodes 25, and the first alignment film 29 are layered in this order in the Z1 direction.

The first substrate 21 is a flat plate having transmissive and insulating properties. The first substrate 21 is, for example, a glass substrate or a quartz substrate.

The stack body 22 includes a plurality of transmissive insulating films, and various wiring lines disposed between the plurality of insulating films. The first substrate 21 and the stack body 22 will be described later.

The pixel electrode 25 has transmissive and conductive properties. The pixel electrode 25 is used to apply an electric field to the liquid crystal layer 5. A material of the pixel electrode 25 is, for example, a transparent conductive material, such as indium tin oxide (ITO), indium zinc oxide (IZO), or fluorine-doped tin oxide (FTO).

The first alignment film 29 has transmissive and insulating properties. The first alignment film 29 aligns liquid crystal molecules of the liquid crystal layer 5. The first alignment film 29 is disposed so as to cover the plurality of pixel electrodes 25. A material of the first alignment film 29 is, for example, polyimide, silicon oxide, and the like.

The counter substrate 3 is disposed facing the element substrate 2. The counter substrate 3 includes a transmissive second substrate 31, a transmissive inorganic insulating film 32, a transmissive common electrode 33, and a transmissive second alignment film 34. Further, although not illustrated, the counter substrate 3 includes a partition, which has light shielding properties, surrounding the display region A10 in plan view. Note that "having light shielding properties" refers to light shielding properties with respect to visible light, and preferably means that transmittance of visible light is less than 50%, and more preferably equal to or less than 10%.

The second substrate 31, the inorganic insulating film 32, the common electrode 33, and the second alignment film 34 are layered in this order in the Z2 direction.

The second substrate 31 is a flat plate having transmissive and insulating properties. The second substrate 31 is, for example, a glass substrate or a quartz substrate.

The inorganic insulating film 32 has transmissive and insulating properties. The inorganic insulating film 32 is formed of an inorganic material including silicon, such as silicon oxide, or the like, for example.

The common electrode 33 is disposed so as to face the plurality of pixel electrodes 25, with the liquid crystal layer 5 interposed therebetween. The common electrode 33 has transmissive and conductive properties. A common potential is applied to the common electrode 33. A material of the common electrode 33 is, for example, a transparent conductive material such as ITO, IZO, FTO, or the like.

The second alignment film 34 has translucency and insulating properties. The alignment film 34 has a function of aligning the liquid crystal molecules of the liquid crystal layer 5. A material of the second alignment film 34 is, for example, polyimide silicon oxide, and the like.

The sealing member 4 is disposed between the element substrate 2 and the counter substrate 3. The sealing member 4 is formed using an adhesive containing various types of curable resin, such as epoxy resin, for example. The sealing member 4 may include a gap material formed of an inorganic material such as glass.

The liquid crystal layer 5 is disposed in a region surrounded by the element substrate 2, the counter substrate 3, and the sealing member 4. The liquid crystal layer 5 contains liquid crystal molecules having positive or negative dielectric anisotropy. The alignment of the liquid crystal molecules changes depending on a voltage applied to the liquid crystal layer 5, and the optical characteristics of the liquid crystal layer 5 change.

Light LL is incident on the liquid crystal device 100 from the counter substrate 3, and is modulated in accordance with an image signal while being emitted from the element substrate 2. In this way, the liquid crystal device 100 displays an image. Note that the liquid crystal device 100 may be configured to display the image by causing the light LL to be incident from the element substrate 2 and emit the modulated light from the counter substrate 3.

The liquid crystal device 100 is applied to a projection-type projector to be described later, for example. In this case, the liquid crystal device 100 functions as a light valve.

1B. Electrical Configuration of Element Substrate 2

Figure 3:
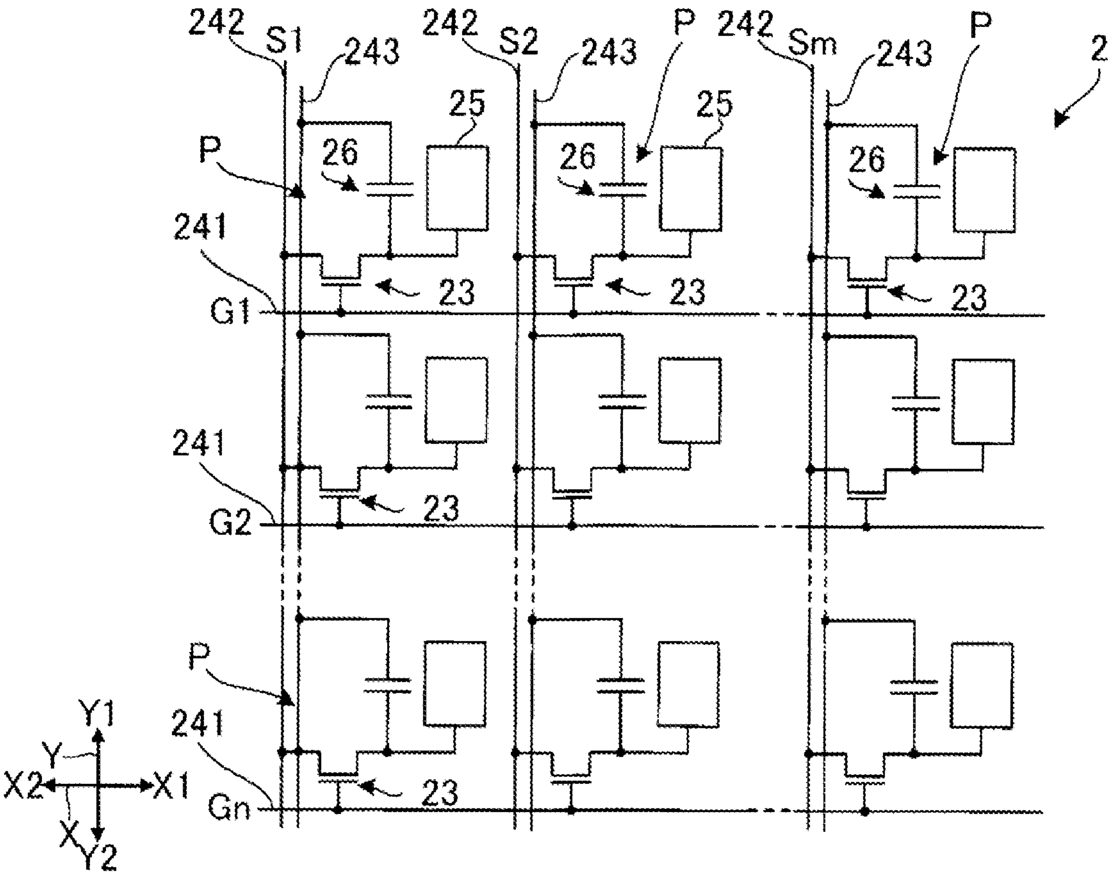
FIG. 3 is an equivalent circuit diagram illustrating an electrical configuration of an element substrate.

FIG. 3 is an equivalent circuit diagram illustrating an electrical configuration of the element substrate illustrated in FIG. 1. The stack body 22 of the element substrate 2 illustrated in FIG. 2 is provided with a plurality of transistors 23, n scanning lines 241, m data lines 242, and n constant potential lines 243 illustrated in FIG. 3. Note that both n and m are integers of 2 or more.

The transistors 23 are provided corresponding to each of intersections between the n scanning lines 241 and the m data lines 242. Each of the transistors 23 is, for example, a thin film transistor (TFT) that functions as a switching element. Each of the transistors 23 includes a gate, a source and a drain.

The scanning line 241 extends in the X direction, and the n scanning lines 241 are aligned at equal intervals in the Y direction. The scanning line 241 is electrically coupled to the gate of the corresponding transistor 23. The scanning line 241 is electrically coupled to the scanning line drive circuit 11 illustrated in FIG. 1, and corresponding scanning signals G1, G2, . . . or Gn from the scanning line drive circuit 11 are supplied thereto.

The data line 242 extends in the Y direction, and the m data lines 242 are aligned at equal intervals in the X direction. The data line 242 is electrically coupled to the source of the corresponding transistor 23. The m data lines 242 are electrically coupled to the data line driving circuit 12 illustrated in FIG. 1. Corresponding image signals S1, S2, . . . , or Sm are supplied from the data line driving circuit 12 to the data line 242.

The n scanning lines 241 and the data lines 242 are electrically insulated from each other and are formed in a lattice-like pattern in plan view. A region surrounded by two of the adjacent scanning lines 241 and two of the adjacent data lines 242 corresponds to the pixel P. Each of the pixel electrodes 25 is electrically connected to the drain of the corresponding transistor 23.

The constant potential line 243 extends in the Y direction, and the n constant potential lines 243 are aligned at equal intervals in the X direction. Further, the constant potential line 243 is electrically insulated from the data line 242 and the scanning line 241. A fixed potential, such as a ground potential, is applied to the constant potential line 243. Note that a common potential may be applied to the constant potential line 243. The potential of the constant potential line 243 is supplied to one electrode of a capacitance element 26. The capacitance element 26 is a retention capacitor for retaining the potential of the pixel electrode 25, and another electrode of the capacitance element 26 is electrically coupled to the pixel electrode 25 and the drain of the transistor 23.

When the corresponding scanning line 241 is selected by the scanning signals G1, g2, . . . , and Gn, the transistor 23 coupled to the selected scanning line 241 is in an on state. Then, via the data lines 242, the image signals S1, S2, . . . , and Sm commensurate with the grayscale to be displayed are applied to the pixel electrode 25 of the pixel P corresponding to the selected scanning line 241. In this way, the voltage commensurate with the grayscale to be displayed is applied to the liquid crystal layer 5, and the alignment of the liquid crystal molecules changes in accordance with the applied voltage. Due to such a variation in the alignment of the liquid crystal molecules, the light LL is modulated, and the grayscale display is thus possible.

1C. Structure of Element Substrate 2

Figure 4:
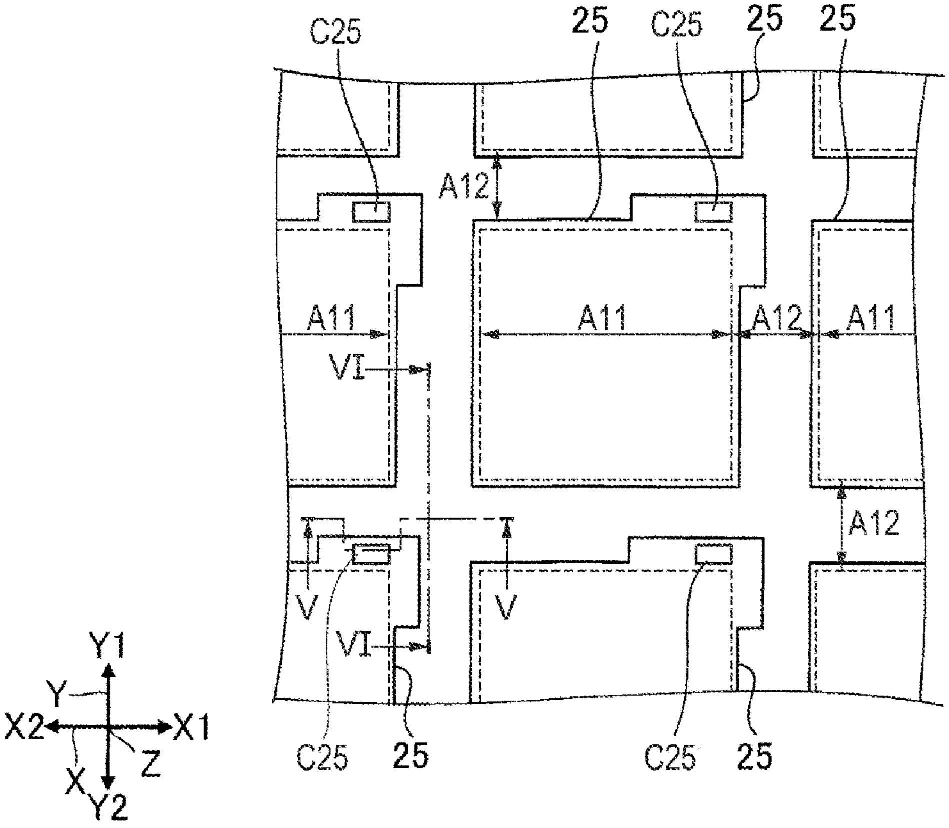
FIG. 4 is a plan view illustrating a portion of the element substrate illustrated in FIG. 3.

FIG. 4 is a plan view illustrating a portion of the element substrate illustrated in FIG. 2. FIG. 4 corresponds to a line IV-IV illustrated in FIG. 2, and illustrates a portion of the element substrate 2 in the display region A10.

As illustrated in FIG. 4, the plurality of pixel electrodes 25 included in the element substrate 2 are separated from each other and are disposed in a matrix.

Rectangular regions indicated by dashed lines are openings A11 through which light is transmitted, and frame-shaped regions between two of the adjacent openings A11 are light-shielding regions A12 in which the light is blocked.

The pixel electrode 25 is provided in the opening A11. An outer edge portion of the pixel electrode 25 is provided so as to overlap with the light-shielding region A12.

The transistor 23, the capacitance element 26, and the scanning line 241, the data line 242, the constant potential line 243, and the like illustrated in FIG. 3 are disposed in the light-shielding region A12.

The pixel electrode 25 is coupled to the transistor 23 and the capacitance element 26 via a contact hole C25.

Figure 5:
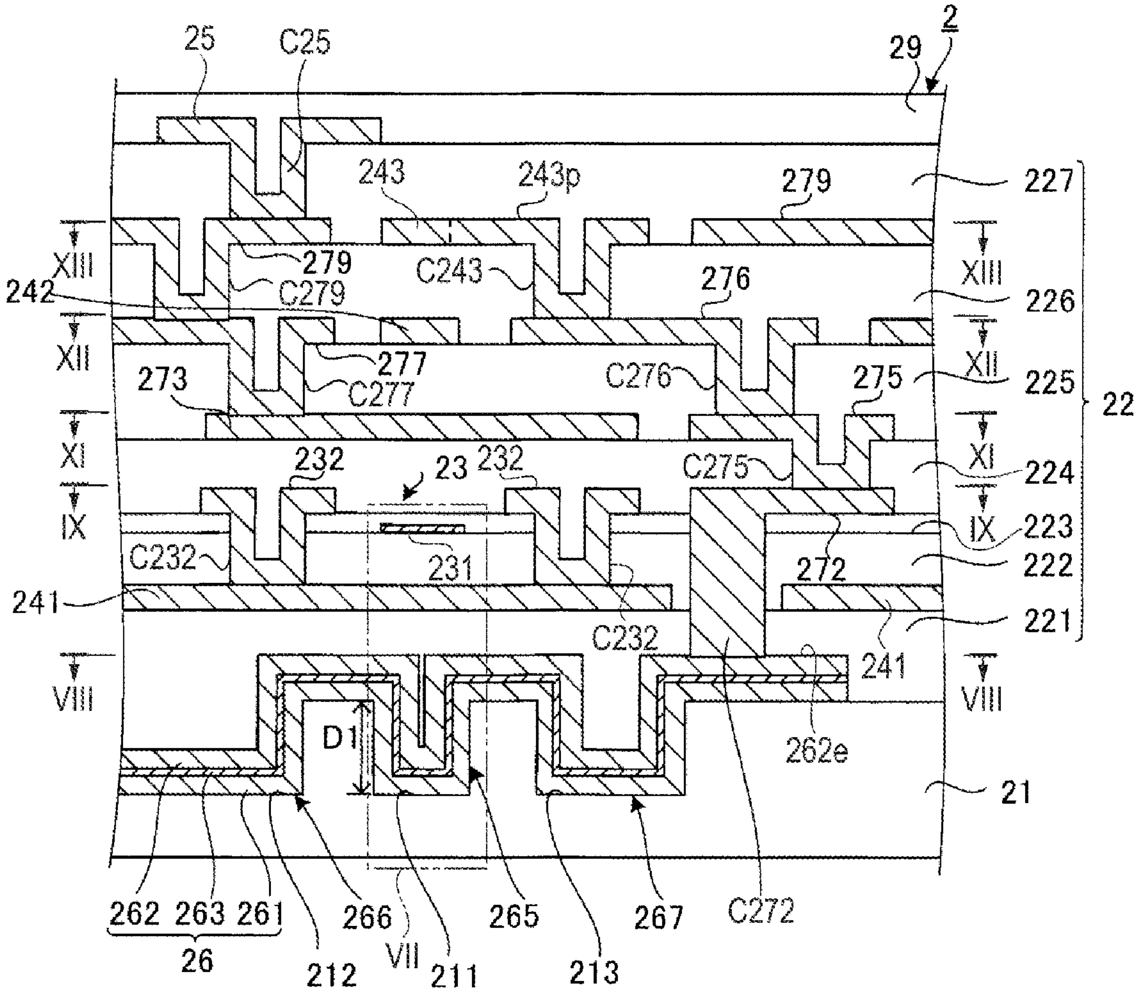
FIG. 5 is a cross-sectional view, taken along a line V-V, of the element substrate illustrated in FIG. 4.
Figure 5:
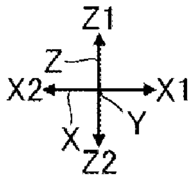
Figure 6:
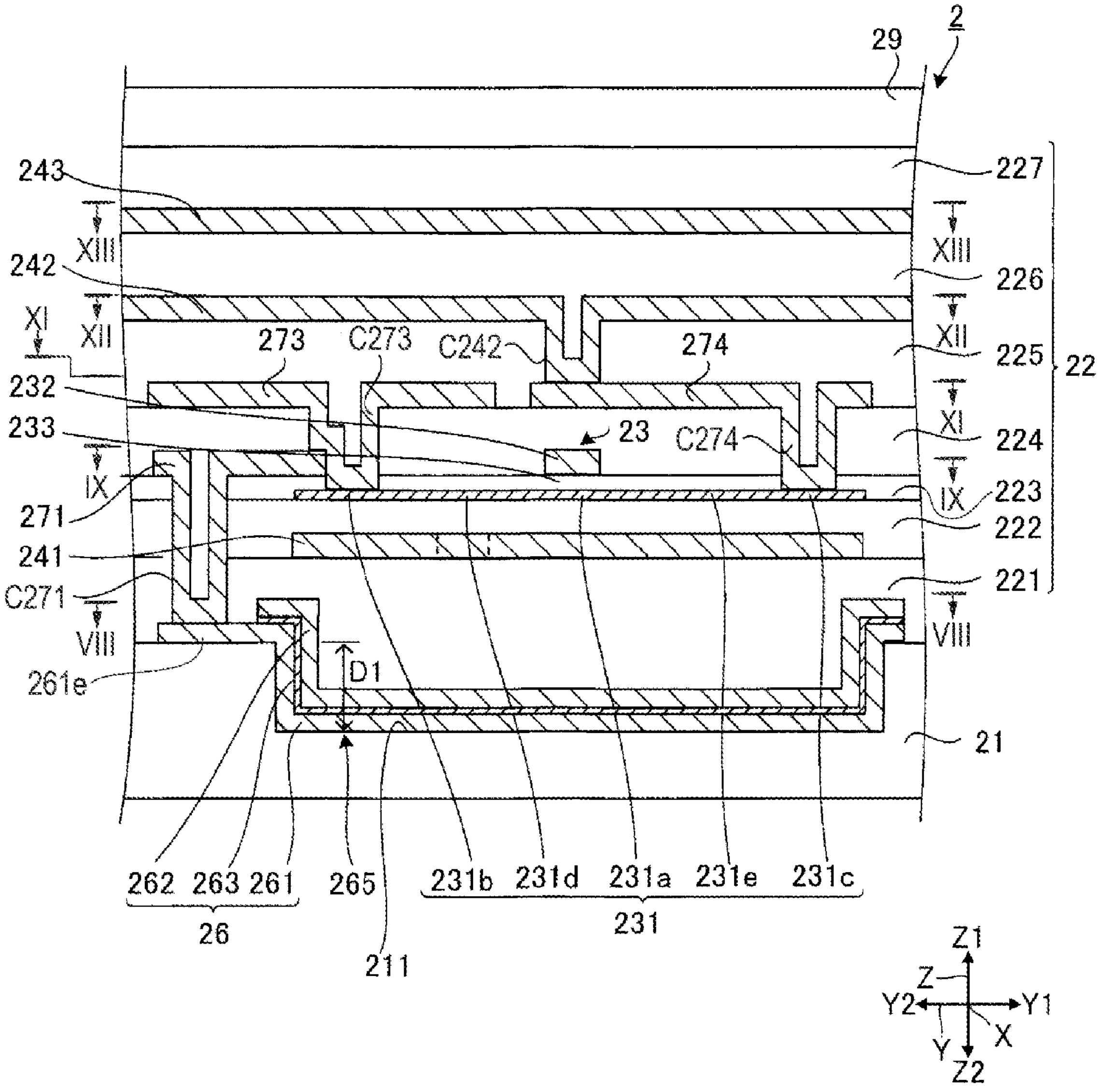
FIG. 6 is a cross-sectional view, taken along a line VI-VI, of the element substrate illustrated in FIG. 4.

FIG. 5 is a cross-sectional view schematically illustrating a cross-section taken along a line V-V line of the element substrate illustrated in FIG. 4, and FIG. 6 is a cross-sectional view schematically illustrating a cross-section taken along a line VI-VI of the element substrate illustrated in FIG. 4.

The first substrate 21 illustrated in FIG. 5 and FIG. 6 includes a first groove portion 211, a second groove portion 212, and a third groove portion 213 as second recessed portions.

The first groove portion 211, the second groove portion 212, and the third groove portion 213 are grooves respectively provided in the first substrate 21. As illustrated in FIG. 6, the first groove portion 211 includes a groove that is long in the Y direction. As illustrated in FIG. 5, the second groove portion 212 and the third groove portion 213 are disposed so as to be separated from the first groove portion 211 in the X1 direction and the X2 direction, respectively.

The capacitance element 26 is provided in the first groove portion 211, the second groove portion 212, and the third groove portion 213.

The capacitance element 26 is provided for each of the pixels P. The capacitance element 26 includes a first capacitance electrode 261, a dielectric film 263, and a second capacitance electrode 262. The capacitance element 26 includes a first trench capacitance portion 265 and a second trench capacitance portion 266 and a third trench capacitance portion 267.

The first trench capacitance portion 265 is disposed at the first groove portion 211, and has a recessed shape that reflects the shape of the first groove portion 211. The second trench capacitance portion 266 is a portion disposed at the second groove portion 212. The third trench capacitance portion 267 is a portion disposed at the third groove portion 213.

The stack body 22, the pixel electrodes 25, and the first alignment film 29 are provided covering the first substrate 21 and the capacitance element 26.

The stack body 22 includes a first insulating film 221, a second insulating film 222, a third insulating film 223, a fourth insulating film 224, a fifth insulating film 225, a sixth insulating film 226, a seventh insulating film 227, the scanning lines 241, a semiconductor film 231, gate electrodes 232, the data lines 242, the constant potential lines 243, and relay electrodes 271, 272, 273, 274, 275, 276, 277, and 279.

The first capacitance electrode 261 is electrically coupled to the transistor 23 and the pixel electrode 25. As illustrated in FIG. 6, the first capacitance electrode 261 is electrically coupled to a drain region 231*b* of the semiconductor film 231 of the transistor 23, via the relay electrodes 271 and 273. Further, as illustrated in FIG. 5, the relay electrode 273 is electrically coupled to the pixel electrode 25 via the relay electrodes 277 and 279.

As illustrated in FIG. 6, the relay electrode 271 is provided on the third insulating film 223, and is also provided on the inner wall of a contact hole C271 that penetrates the third insulating film 223, the second insulating film 222, and the first insulating film 221, and exposes a coupling portion 261*e* of the first capacitance electrode 261. The relay electrode 271 is thus electrically coupled to the first capacitance electrode 261 via the contact hole C271.

The relay electrode 273 is provided on the fourth insulating film 224, and is also provided on the inner wall of a contact hole C273 that penetrates the fourth insulating film 224 and the fifth insulating film 225, and exposes the drain region 231*b* of the semiconductor film 231. The relay electrode 273 is thus electrically coupled to the drain region 231*b* via the contact hole C273.

As illustrated in FIG. 5, the relay electrode 277 is provided on the fifth insulating film 225, and is also provided on the inner wall of a contact hole C277 that penetrates the fifth insulating film 225 and exposes the relay electrode 273. The relay electrode 277 is thus electrically coupled to the relay electrode 273 via the contact hole C277. The relay electrode 279 is provided on the sixth insulating film 226, and is also provided on the inner wall of a contact hole C279 that penetrates the sixth insulating film 226 and exposes the relay electrode 277. The relay electrode 279 is thus electrically coupled to the relay electrode 277 via the contact hole C279. The pixel electrode 25 is provided on the seventh insulating film 227, and is also provided on the inner wall of the contact hole C25 that penetrates the seventh insulating film 227 and exposes the relay electrode 279. The pixel electrode 25 is thus electrically coupled to the relay electrode 279 via the contact hole C25.

The second capacitance electrode 262 is electrically coupled to the constant potential line 243. The second capacitance electrode 262 is electrically coupled to the constant potential line 243 via the relay electrodes 272, 275, and 276.

As illustrated in FIG. 5, the relay electrode 272 is provided on the third insulating film 223, and is also provided on the inner wall of a contact hole C272 that penetrates the third insulating film 223, the second insulating film 222, and the first insulating film 221, and exposes a coupling portion 262*e* of the second capacitance electrode 262. The relay electrode 272 is thus electrically coupled to the second capacitance electrode 262 via the contact hole C272. The relay electrode 275 is provided on the fourth insulating film 224, and is also provided on the inner wall of a contact hole C275 that penetrates the fourth insulating film 224 and exposes the relay electrode 272. The relay electrode 275 is thus electrically coupled to the relay electrode 272 via the contact hole C275. The relay electrode 276 is provided on the fifth insulating film 225, and is also provided on the inner wall of a contact hole C276 that penetrates the fifth insulating film 225 and exposes the relay electrode 275. The relay electrode 276 is thus electrically coupled to the relay electrode 275 via the contact hole C276. The constant potential line 243 is provided on the sixth insulating film 226, and is also provided on the inner wall of a contact hole C243 that penetrates the sixth insulating film 226 and exposes the relay electrode 276. The constant potential line 243 includes a protrusion 243*p* protruding in the X1 direction, and is electrically coupled to the relay electrode 276, via the contact hole C243, at the position of the protrusion 243*p*.

The gate electrode 232 is electrically coupled to the scanning line 241. The gate electrode 232 is provided on the third insulating film 223, and is also provided on the inner wall of a contact hole C232 that penetrates the third insulating film 223 and the second insulating film 222, and exposes the scanning line 241. The gate electrode 232 is thus electrically coupled to the scanning line 241 via the contact hole C232. Note that, as illustrated in FIG. 6, of the third insulating film 223, a region corresponding to the gate electrode 232 corresponds to a gate insulating film 233.

The data line 242 is electrically coupled to a source region 231*c* of the semiconductor film 231.

As illustrated in FIG. 6, the data line 242 is provided on the fifth insulating film 225, and is also provided on the inner wall of a contact hole C242 that penetrates the fifth insulating film 225 and exposes the relay electrode 274. The data line 242 is thus electrically coupled to the relay electrode 274 via the contact hole C242. The relay electrode 274 is provided on the fourth insulating film 224, and is also formed on the inner wall of a contact hole C274 that penetrates the fourth insulating film 224 and exposes the source region 231*c* of the semiconductor film 231. The relay electrode 274 is thus electrically coupled to the source region 231*c*.

Figure 7:
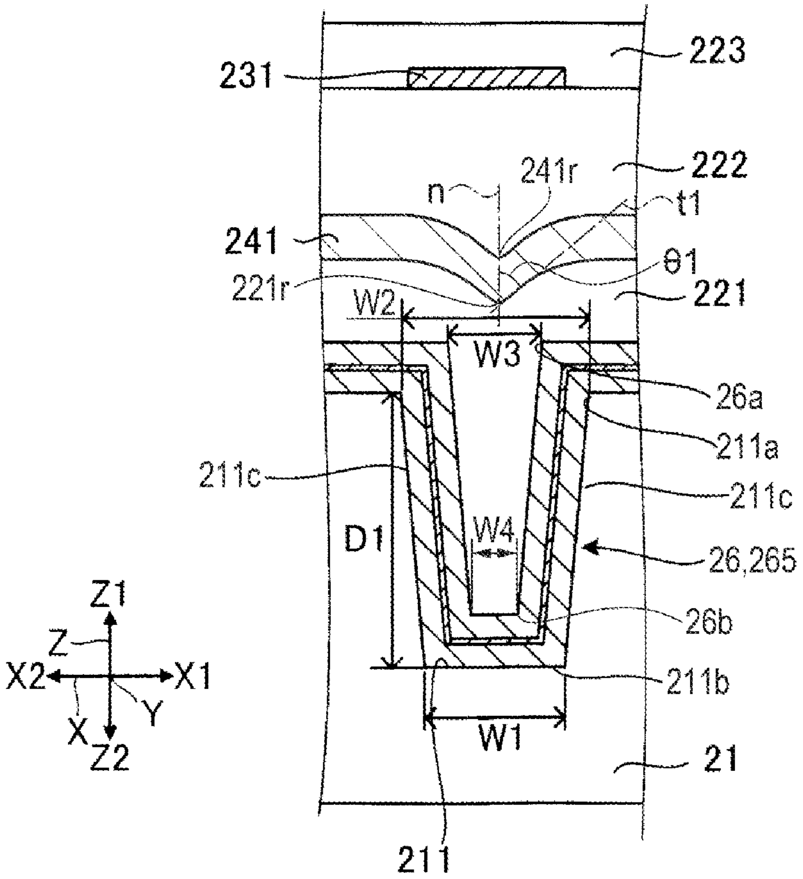
FIG. 7 is an enlarged cross-sectional view corresponding to a region VII surrounded by a one-dot chain line in FIG. 5.

FIG. 7 is an enlarged cross-sectional view corresponding to a region VII surrounded by a one-dot chain line in FIG. 5.

The first groove portion 211 includes an opening 211*a* formed by opening the top surface of the first substrate 21, a bottom surface 211*b* positioned in the Z2 direction with respect to the opening 211*a*, and wall surfaces 211*c* between the opening 211*a* and the bottom surface 211*b*. The first trench capacitance portion 265 provided inside the first groove portion 211 has a concave shape reflecting the shape of the first groove portion 211.

Here, a width W1, which is a length of the bottom surface 211*b* of the first groove portion 211 in the X direction, is from 0.3 μm to 0.8 μm, for example. A width W2, which is a length of the opening 211*a* in the X direction, is from 0.4 μm to 0.9 μm, for example. A width W3, which is a length of an opening 26*a* of the first trench capacitance portion 265 in the X direction, is from 0.2 μm to 0.7 μm, for example. A width W4, which is the length of a bottom surface 26*b* of the first trench capacitance portion 265 in the X direction, is from 0.1 μm to 0.5 μm, for example. Further, a depth D1 of the first groove portion 211 is from 0.5 μm to 2.0 μm, for example.

The first insulating film 221 is stacked on the capacitance element 26 as an insulating film. In the first insulating film 221, at a portion overlapping the opening 26*a* of the first trench capacitance portion 265, a concave portion 221*r* is formed as a recessed portion reflecting the concave shape of the first trench capacitance portion 265.

The concave portion 221*r* has a curved bottom surface. In the embodiment, an angle θ1 formed by a tangent line t1 tangent to the curved bottom surface and a normal line n of the first substrate 21 is 52°. Note that the angle θ1 is a minimum angle, of angles formed by the tangent line t1 tangent to the curved bottom surface and the normal line n of the first substrate 21.

The angle θ1 is preferably not less than 40° and less than 90°. The inventors of the present disclosure provide the following findings by experimentation. When the angle θ1 is not less than 40° and less than 90°, the occurrence of defects such as a seam, a crack, or film formation unevenness, are suppressed from occurring in the scanning line 241 provided on the first insulating film 221. When the angle θ1 is not less than 40° and less than 90°, display defects or a deterioration in display quality resulting from breaking of the scanning line 241, from development of high resistance in the wiring resistance of the scanning line 241, from a deterioration in the light shielding performance of the scanning line 241, or the like are suppressed.

The scanning line 241 is provided on the first insulating film 221. In the scanning line 241, a concave portion 241*r* reflecting the shape of the concave portion 221*r* is formed at a position overlapping the concave portion 221*r* of the first insulating film 221. The concave portion 241*r* has a curved bottom surface, in a similar manner to the concave portion 221*r*.

Figure 8:
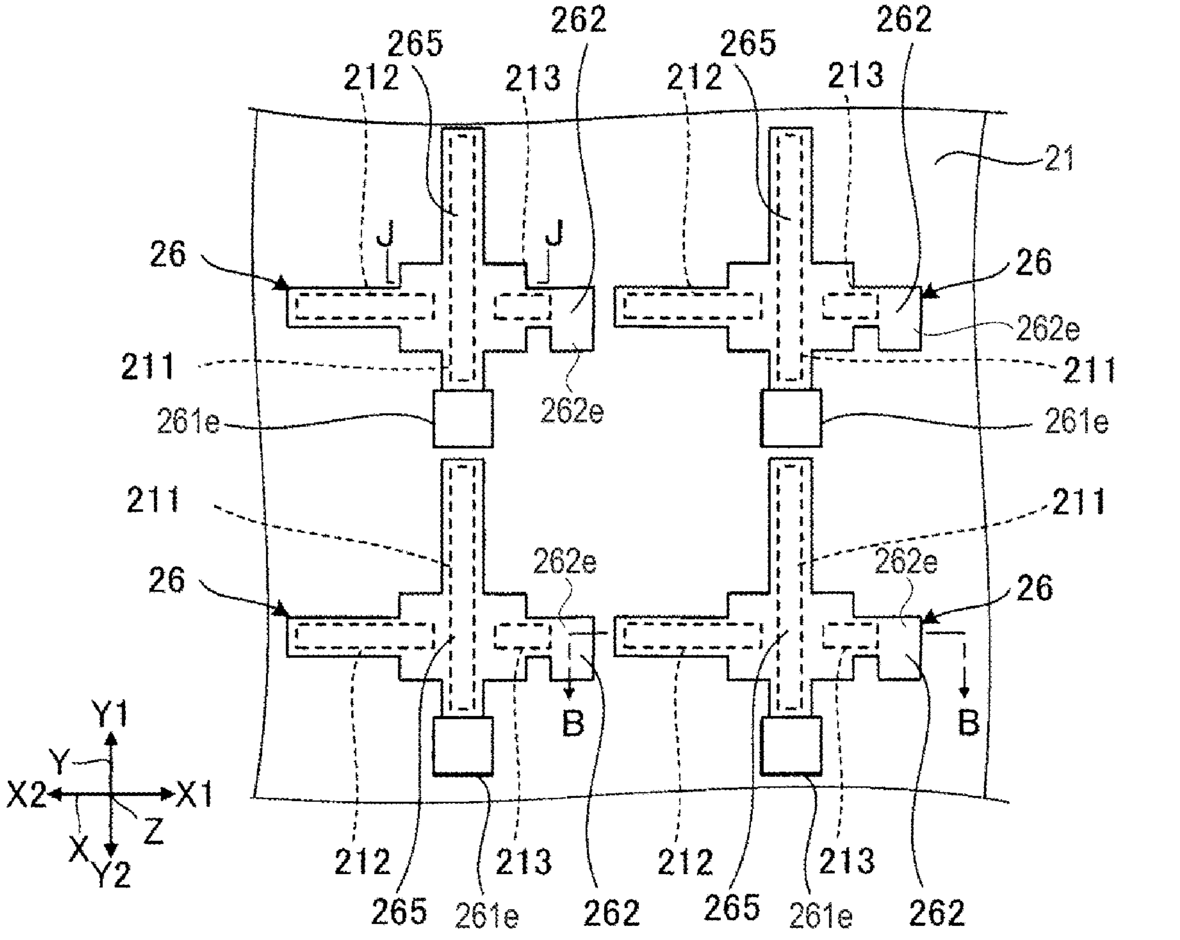
FIG. 8 is a plan view corresponding to a line VIII-VIII in FIG. 5 and FIG. 6.

FIG. 8 is a plan view corresponding to a line VIII-VIII in FIG. 5 and FIG. 6.

A layered film including the first capacitance electrode 261, the dielectric film 263, and the second capacitance electrode 262 is provided on a surface including the first groove portion 211, the second groove portion 212, and the third groove portion 213 of the first substrate 21.

The first groove portion 211 has a rectangular shape that is long in the Y direction in plan view. The second groove portion 212 and the third groove portion 213 have a rectangular shape that is long in the X direction. The first groove portion 211 is provided between the second groove portion 212 and the third groove portion 213 in plan view.

The capacitance element 26 includes a portion extending in the Y direction and a portion extending in the X direction, and an intersection portion between the two. Further, the capacitance element 26 is provided so as to cover the first groove portion 211, the second groove portion 212, and the third groove portion 213 in plan view, and to also include a portion that widens to the outside of the first groove portion 211, the second groove portion 212, and the third groove portion 213. The coupling portion 261*e* is provided at one end in the Y2 direction of the first capacitance electrode 261. The coupling portion 261*e* and the first groove portion 211 do not overlap in plan view. As illustrated in FIG. 6, the coupling portion 261*e* is a portion where the dielectric film 263 and the second capacitance electrode 262 overlapping the first capacitance electrode 261 are cut away, and the first capacitance electrode 261 and the relay electrode 271 are electrically coupled at the coupling portion 261*e*.

Further, as illustrated in FIG. 8, the coupling portion 262*e* is provided at one end in the X1 direction of the second capacitance electrode 262. The coupling portion 262*e* does not overlap with the second groove portion 212 nor the third groove portion 213 in plan view. As illustrated in FIG. 5, the second capacitance electrode 262 and the constant potential line 243 are electrically coupled at the coupling portion 262*e*.

Figure 9:
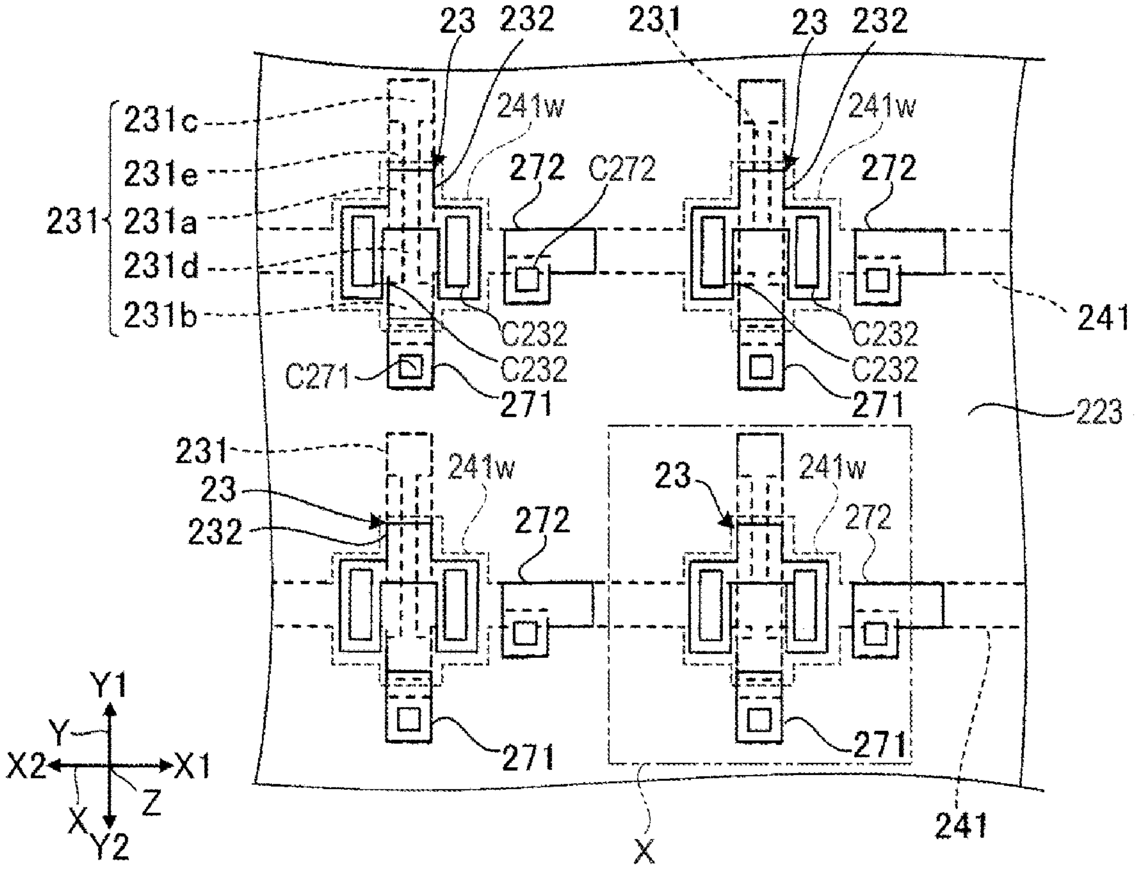
FIG. 9 is a plan view corresponding to a line IX-IX in FIG. 5 and FIG. 6.

FIG. 9 is a plan view corresponding to a line IX-IX in FIG. 5 and FIG. 6. The first insulating film 221, the scanning lines 241, the second insulating film 222, the semiconductor film 231, the third insulating film 223, the gate electrodes 32, and the relay electrodes 271 and 272 are layered on the first substrate 21 and the capacitance elements 26 illustrated in FIG. 8.

In plan view, in the semiconductor film 231, the drain region 231*b*, a low-density drain region 231*d*, a channel region 231*a*, a low-density source region 231*e*, and the source region 231*c* are arranged in this order along the Y1 direction. The width of the semiconductor film 231 in the X direction is 0.3 μm, for example. In plan view, the semiconductor film 231 has a shape that is long in the Y direction. Note that the drain region 231*b* and the source region 231*c* are formed to be wider than the channel region 231*a*.

The scanning line 241 extends in the X direction in plan view, with a width from 0.5 μm to 1 μm, for example. The scanning line 241 includes a wide portion 241*w* that is wider than a main body portion extending in the X direction. The wide portion 241*w* is provided with the protrusion 243*p* extending in the Y1 direction and the Y2 direction, and covers the semiconductor film 231 from the first substrate 21. The contact hole C232 is provided at the wide portion 241*w*, and the scanning line 241 is electrically coupled to the gate electrode 232 at the wide portion 241*w*. The gate electrode 232 overlaps the channel region 231*a* of the semiconductor film 231 in plan view.

Figure 10:
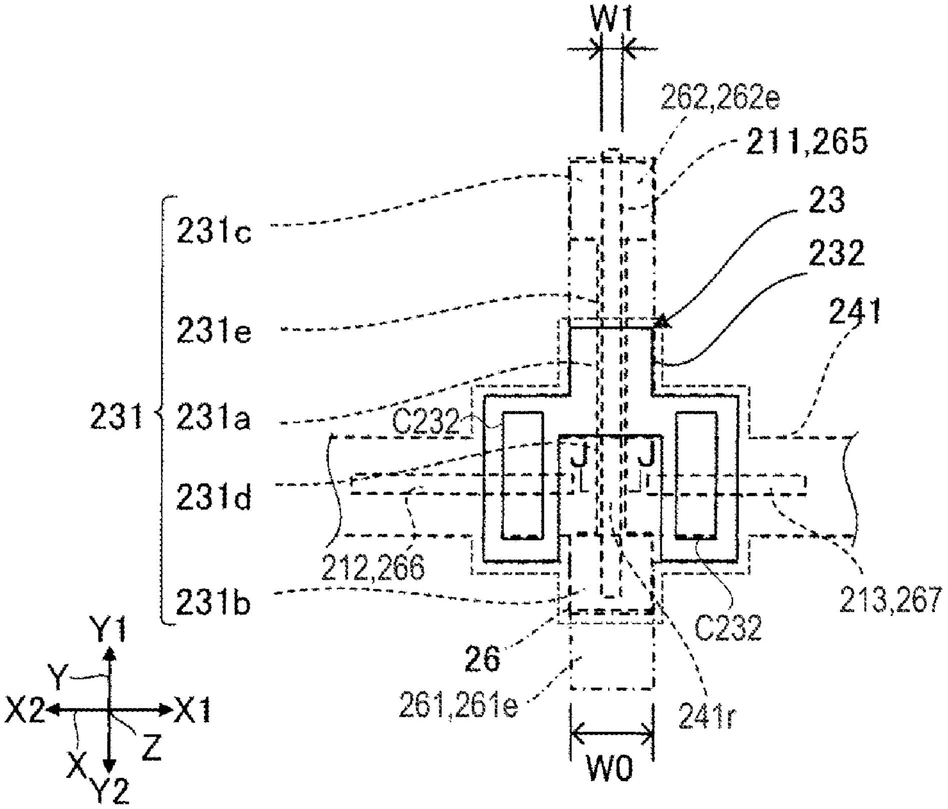
FIG. 10 is an enlarged plan view corresponding to a region X in FIG. 9.

FIG. 10 is an enlarged plan view corresponding to a region X surrounded by a two-dot chain line in FIG. 9. FIG. 10 illustrates a planar positional relationship between the first groove portion 211, the first trench capacitance portion 265, the scanning line 241, the semiconductor film 231, and the gate electrode 232.

The first groove portion 211 is disposed along an extending direction of the semiconductor film 231 in plan view, and overlaps the semiconductor film 231 in plan view. In a similar manner, the first trench capacitance portion 265 of the capacitance element 26 provided at the first groove portion 211 is also disposed along the semiconductor film 231 in plan view and overlaps the semiconductor film 231. Further, in the scanning line 241, the concave portion 241*r* of the scanning line 241 is formed along the first trench capacitance portion 265, at a position overlapping the first trench capacitance portion 265 in plan view.

Further, in the example illustrated in FIG. 10, the width W1 of the bottom surface 211*b* of the first groove portion 211 is less than or equal to a width W0 of the source region 231*c* of the semiconductor film 231, and is smaller than the width of the channel region 231*a*. Further, although not illustrated, the width W2 of the opening 211*a* of the first groove portion 211 is greater than the width of the channel region 231*a*. Note that the width W1 of the bottom surface 211*b* of the first groove portion 211 may be equal to or greater than the width of the channel region 231*a*.

Figure 11:
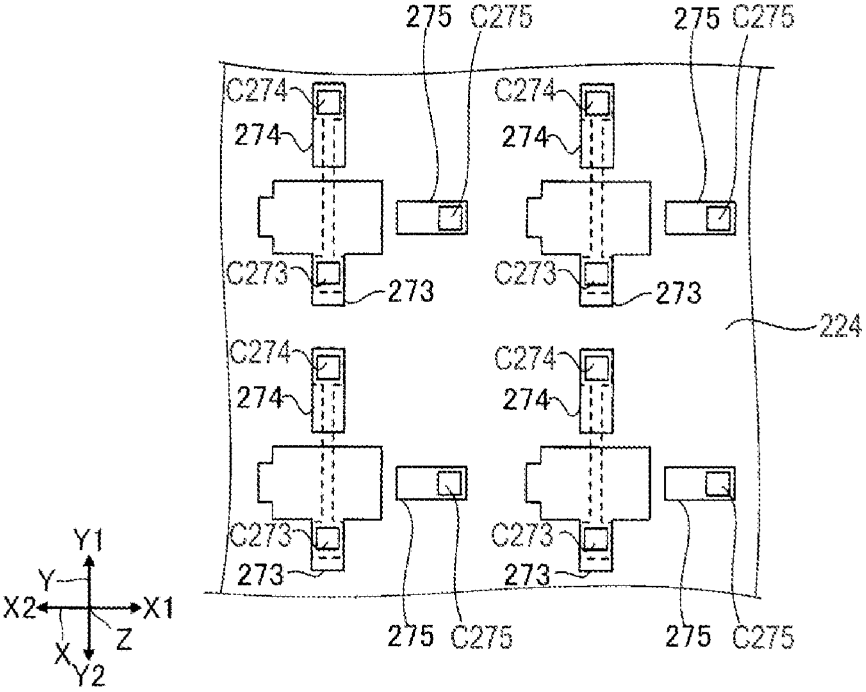
FIG. 11 is a plan view corresponding to a line XI-XI in FIG. 5 and FIG. 6.

FIG. 11 is a plan view corresponding to a line XI-XI in FIG. 5 and FIG. 6.

The relay electrodes 273, 274, and 275 are provided on the fourth insulating film 224.

The relay electrode 273 overlaps a portion of the semiconductor film 231 in plan view.

The relay electrode 274 overlaps a portion of the semiconductor film 231 in plan view, and is disposed so as to be separated from the relay electrode 273 in the Y1 direction.

The relay electrode 275 is disposed so as to be separated from the relay electrode 273 in the X1 direction in plan view.

Figure 12:
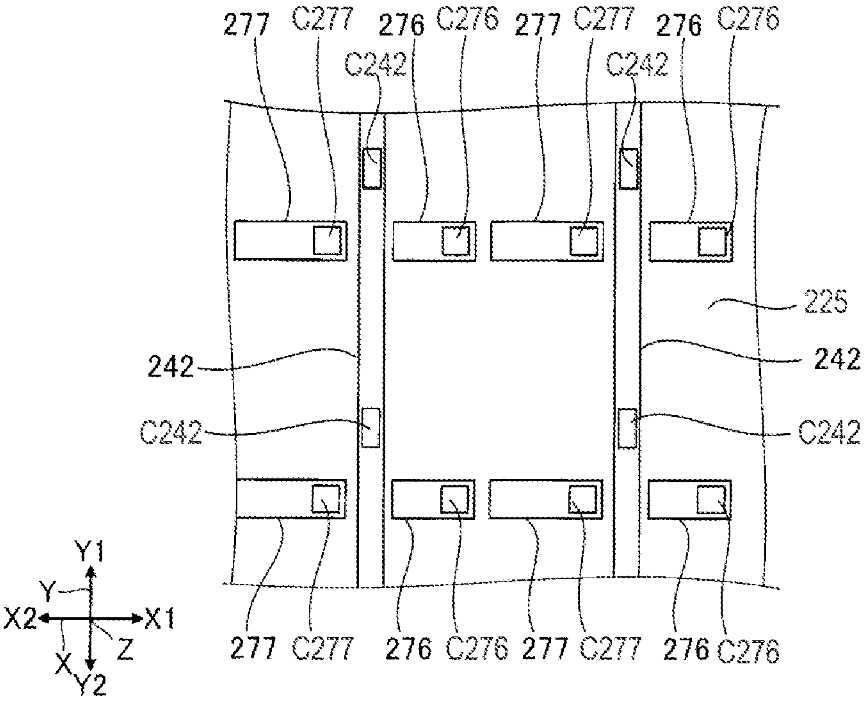
FIG. 12 is a plan view corresponding to a line XII-XII in FIG. 5 and FIG. 6.

FIG. 12 is a plan view corresponding to a line XII-XII in FIG. 5 and FIG. 6.

The data lines 242 and the relay electrodes 276 and 277 are provided on the fifth insulating film 225.

The relay electrode 276 is separated from the corresponding data line 242 in the X1 direction in plan view.

The relay electrode 277 is separated from the corresponding data line 242 in the X2 direction in plan view.

The data line 242 extends in the Y direction, and overlaps the semiconductor film 231 in plan view. The width of the data line 242 is from 0.5 μm to 1 μm, for example.

Figure 13:
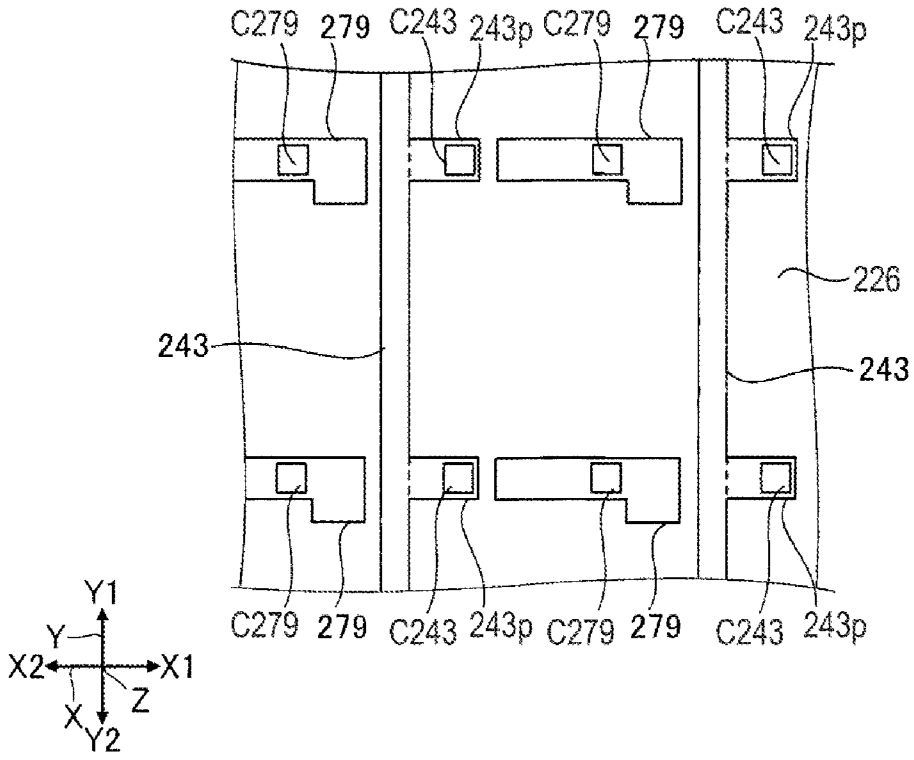
FIG. 13 is a plan view corresponding to a line XIII-XIII in FIG. 5 and FIG. 6.

FIG. 13 is a plan view corresponding to a line XIII-XIII in FIG. 5 and FIG. 6.

The constant potential lines 243 and the relay electrodes 279 are disposed on the sixth insulating film 226.

The constant potential line 243 includes the protrusion 243*p* protruding in the X1 direction from the constant potential line 243 in plan view. The constant potential line 243 extends in the Y direction, and overlaps the data line 242 and the semiconductor film 231 in plan view. The width of the constant potential line 243 is from 0.5 μm to 1 μm, for example.

The relay electrode 279 is disposed in the X2 direction relative to the corresponding constant potential line 243 in plan view.

The configuration described above of various wiring lines and the like included in the element substrate 2 is an example, and is not limited to the configuration illustrated in FIG. 5 and FIG. 6. For example, the scanning lines 241 may be formed in a layer above the transistor 23. In this case, a light shielding film having light shielding properties other than the scanning line 241 is disposed between the capacitance element 26 and the transistor 23. The light shielding film may be any of other wiring lines, other relay electrodes, or an electrically insulating island-shaped light shielding film.

1D. Method of Manufacturing Element Substrate

Figure 14:
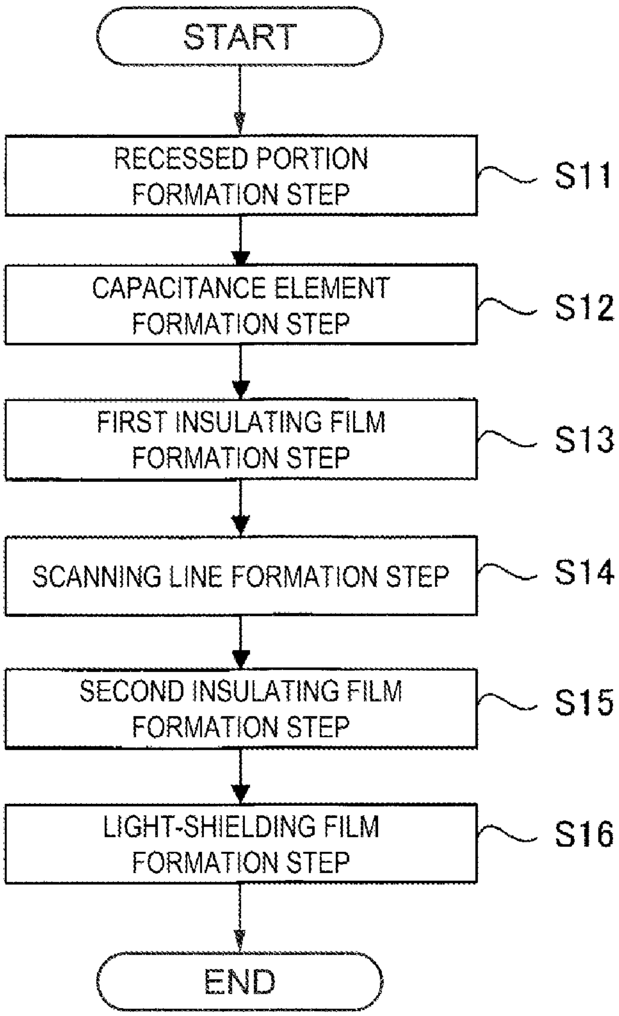
FIG. 14 is a flowchart illustrating part of a flow of a manufacturing method of the element substrate.

FIG. 14 is a flowchart showing a flow of part of a method of manufacturing the element substrate. In the embodiment, of the method of manufacturing the element substrate 2 provided in the liquid crystal device 100, a method of manufacturing the first groove portion 211, the capacitance element 26, the scanning line 241, and the semiconductor film 231 will be described.

Note that the element substrate 2 can be manufactured by a method used in a known semiconductor process, such as low pressure chemical vapor deposition (CVD), normal pressure CVD, plasma CVD, photolithography, sputtering, etching, and chemical mechanical planarization (CMP), or by a combination of these methods.

The method of manufacturing the element substrate 2 includes a recessed portion formation step, a capacitance element formation step, a first insulating film formation step, a scanning line formation step, a second insulating film formation step, and a semiconductor film formation step.

Figure 15:
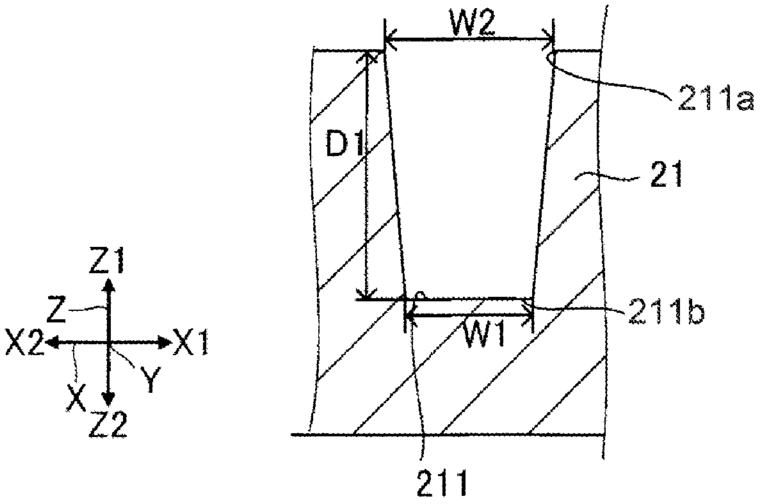
FIG. 15 is a diagram illustrating a recessed portion formation step.

FIG. 15 is a diagram illustrating the recessed portion formation step.

In FIG. 14, at step S11, the first groove portion 211 is formed on the first substrate 21. Note that, at step S11, the second groove portion 212 and the third groove portion 213 are also formed.

As illustrated in FIG. 15, the first groove portion 211 is formed, for example, by forming a mask (not illustrated) on the quartz substrate, and performing anisotropic etching through the mask.

The width W2 in the X direction of the opening 211*a* of the first groove portion 211 is wider than the width W1 of the bottom surface 211*b*, and the first groove portion 211 is formed so that an aspect ratio of the depth D1 of the first groove portion 211 with respect to the width W1 (D1/W1) is greater than 1.

Note that the first groove portion 211 may be configured such that an interlayer insulating film is layered on the first substrate 21, and the first groove portion 211 is provided in the interlayer insulating film or in the interlayer insulating film and the first substrate 21. In this case, the interlayer insulating film provided with the first groove portion 211, or the interlayer insulating film and the first substrate 21 correspond to an insulating member.

Figure 16:
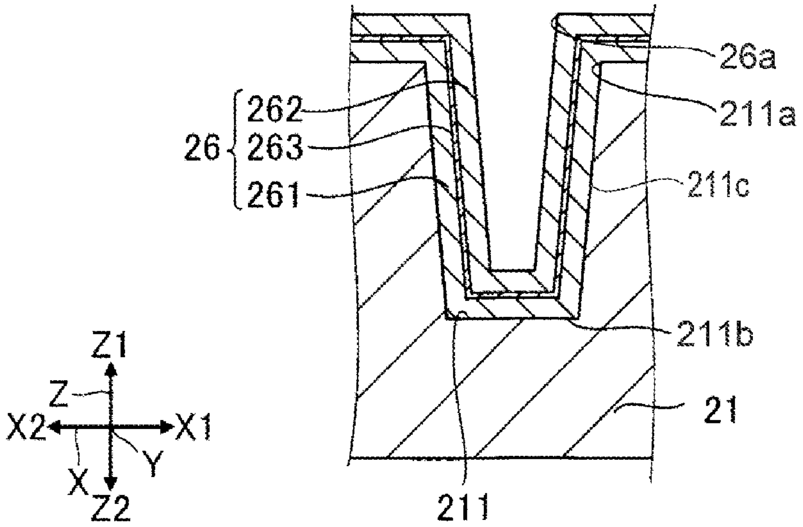
FIG. 16 is a diagram illustrating an element substrate formation step.

FIG. 16 is a diagram illustrating the capacitance element formation step.

In FIG. 14, at step S12, the capacitance element 26 is formed. As illustrated in FIG. 16, the capacitance element 26 is formed so as to cover the opening 211*a* of the first groove portion 211, the bottom surface 211*b* and the wall surfaces 211*c*, and a portion of the XY plane of the first substrate 21. In this step, first, the first capacitance electrode 261 of the capacitance element 26 is formed as a film on the first substrate 21 including the first groove portion 211. Next, the dielectric film 263 is formed so as to cover the first capacitance electrode 261, and finally, the first capacitance electrode 261 is formed as a film on the dielectric film 263. Patterning of the first capacitance electrode 261, the dielectric film 263, and the second capacitance electrode 262 may be performed at one time, or may be divided into two, namely, after the formation of the first capacitance electrode 261 and after the formation of the second capacitance electrode 262.

The material of the first capacitance electrode 261 and the second capacitance electrode 262 is preferably a polysilicon film including an impurity such as phosphorus (P) that is electrically conductive, but may be a metal such as titanium, a metal oxide, or a metal nitride. Further, the dielectric film 263 is preferably a silicon nitride film having a high dielectric constant, but a metal oxide film, such as aluminum oxide, hafnium oxide, silicon oxide, or the like, a metal nitride film, such as silicon nitride or the like, or a multilayer film in which these metal oxide films and metal nitride films are layered may be used.

The thickness of each of the first capacitance electrode 261 and the second capacitance electrode 262 is from 0.03 μm to 0.2 μm, for example. The film thickness of the dielectric film 263 is from 0.01 μm to 0.03 μm, for example. The thickness of the layered film is from 0.07 μm to 0.26 μm, for example.

Figure 17:
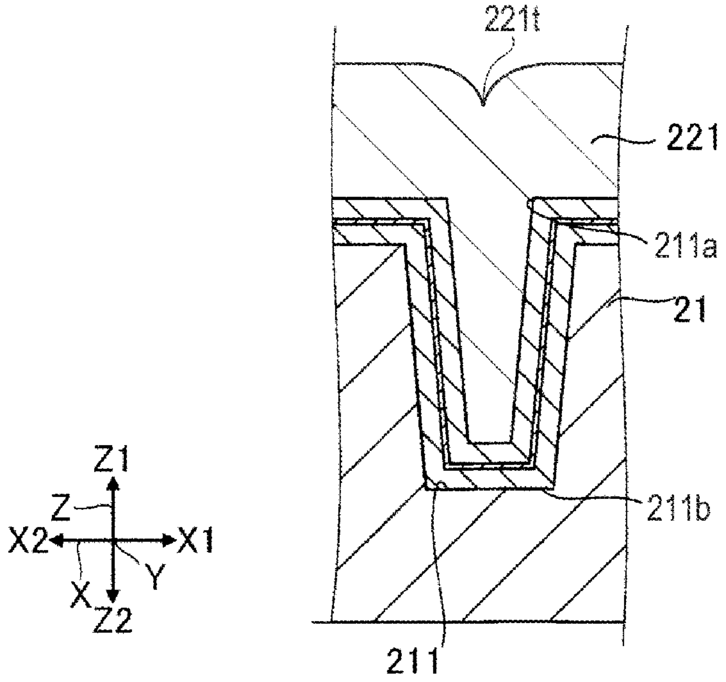
FIG. 17 is a diagram illustrating a first insulating film formation step.
Figure 18:
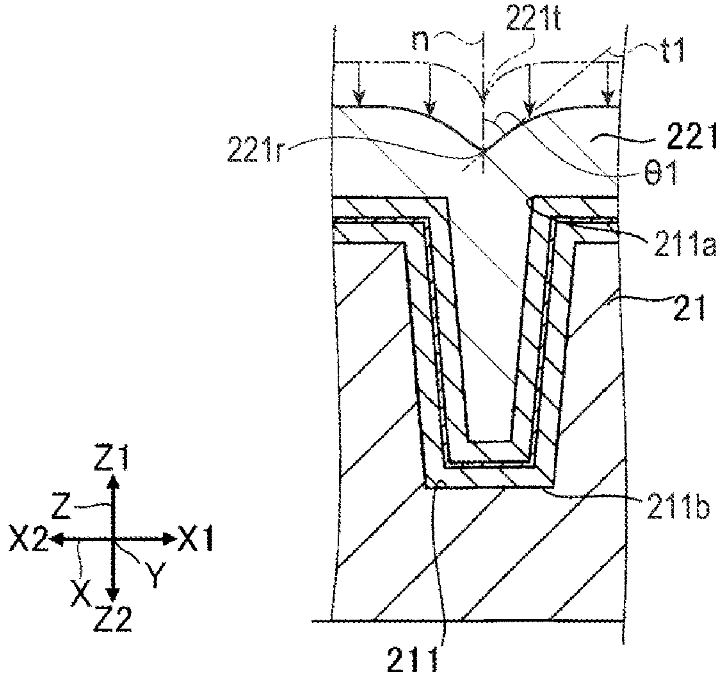
FIG. 18 is a diagram illustrating the first insulating film formation step.

FIG. 17 and FIG. 18 are diagrams illustrating the first insulating film formation step.

In FIG. 14, at step S13, the first insulating film 221 is formed on the capacitance element 26. As illustrated in FIG. 17, in this step, the first insulating film 221 is formed by low pressure CVD to a thickness of approximately 600 nm.

The first insulating film 221 is formed so as to fill the first groove portion 211 of the first substrate 21, and a V-shaped groove 221*t* is formed in the top surface of the first insulating film 221 at a position corresponding to the first groove portion 211. The groove 221*t* has a V shape in which the bottom portion of the groove is pointed at an acute angle.

Next, as illustrated in FIG. 18, the top surface of the first insulating film 221 is etched to approximately 150 nm. In this way, the thickness of the first insulating film 221 becomes approximately 450 nm, and, at the same time, the V-shaped groove 221*t* changes to become the concave portion 221*r* having the curved bottom surface.

The etching of the first insulating film 221 is performed until the minimum angle, of the angles θ1 formed by the tangent line t1 tangent to the curved bottom surface of the concave portion 221*r* and the normal line n of the first substrate 21, is not less than 40° and less than 90°. Note that a planarization process, such as CMP, may be performed in order to obtain the angle θ1 not less than 40° and less than 90°. Further, in order to obtain the angle θ1 not less than 40° and less than 90°, the first insulating film 221 may be formed to be thicker than 600 nm.

Figure 19:
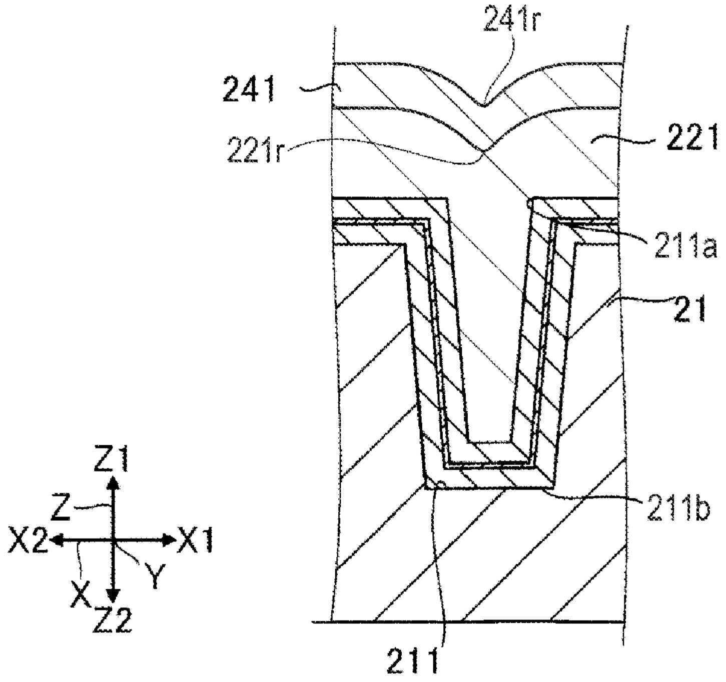
FIG. 19 is a diagram for explaining a scanning line formation step.

FIG. 19 is a diagram illustrating the scanning line formation step.

In FIG. 14, at step S14, the scanning line 241 is formed on the first insulating film 221. As illustrated in FIG. 19, the scanning line 241 is formed by first forming a metal film by sputtering or by vapor deposition, and then performing etching, using a resist mask, on the metal film. At this time, the concave portion 241*r* having the curved bottom surface reflecting the shape of the concave portion 221*r* of the first insulating film 221 is formed in the scanning line 241.

A metal material having light shielding properties is used as the material of the scanning line 241. For example, a metal material including tungsten or tungsten silicide is preferably used. In this way, the semiconductor film 231 can be shielded from light by the scanning line 241, even when a polysilicon film having low light shielding properties is used for the first capacitance electrode 261 and the second capacitance electrode 262.

Figure 20:
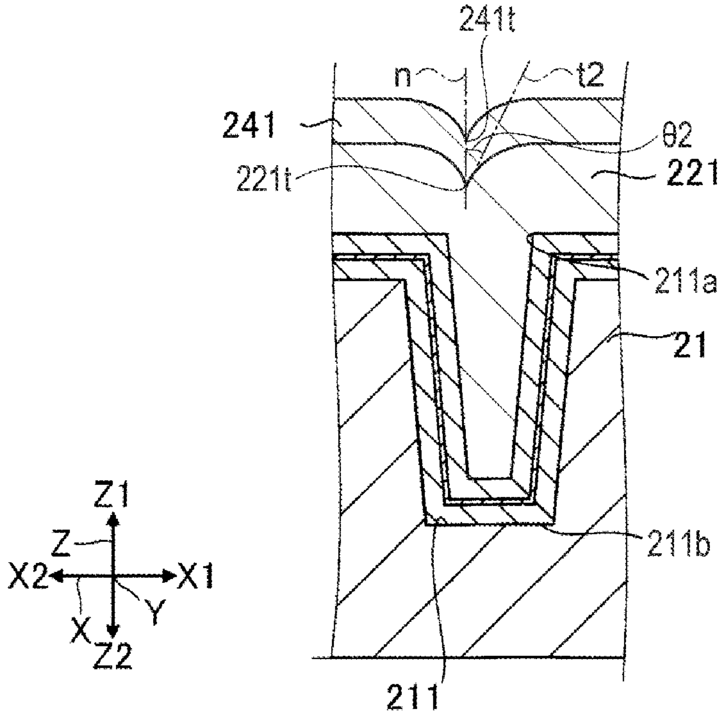
FIG. 20 is a diagram illustrating a scanning line formation step according to a comparative example.

FIG. 20 is a diagram illustrating the scanning line formation step according to a comparative example.

In the comparative example, the first insulating film 221 is formed to a thickness of approximately 600 nm, and the scanning line 241 was formed without performing the etching. A V-shaped groove 241*t* reflecting the shape of the V-shaped groove 221*t* of the first insulating film 221 is formed in the scanning line 241.

At the bottom portion of the groove 221*t*, an angle θ2 formed by a tangent line t2 tangent to an inclined surface of the groove 221*t* and the normal line n of the first substrate 21 is approximately 28°. The angle θ2 is a minimum angle, of angles formed by the tangent line t2 tangent to the inclined surface of the groove 221*t* and the normal line n of the first substrate 21, at the bottom portion of the groove 221*t*. According to the experimentation by the inventors of the present disclosure, when the angle θ2 is less than 40°, it is found that defects, such as a seam, a crack, or a film formation unevenness, occurs in a portion of the groove 241*t* of the scanning line 241.

Figure 21:
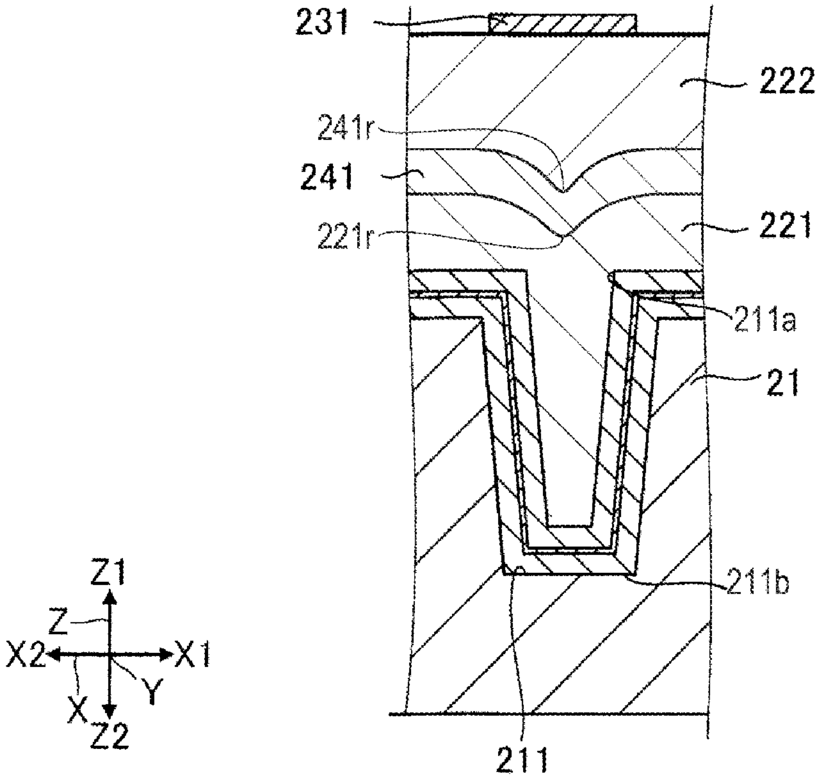
FIG. 21 is a diagram illustrating a second insulating film formation step.

FIG. 21 is a diagram illustrating the second insulating film formation step and the semiconductor film formation step.

In FIG. 14, at step S15, the second insulating film 222 is formed on the scanning line 241. As illustrated in FIG. 21, the second insulating film 222 is formed by low pressure CVD, for example. The surface of the second insulating film 222, in the Z1 direction, overlapping the first groove portion 211 is a flat surface. The second insulating film 222 is layered on the concave portion 241*r* of the scanning line 241, and thus the surface in the Z1 direction of the second insulating film 222 becomes the flat surface.

In FIG. 14, at step S16, the semiconductor film 231 is formed on the second insulating film 222. As illustrated in FIG. 21, in this step, first, an amorphous silicon film is formed on the second insulating film 222, and a crystallized polysilicon film is formed by subjecting the film to heat treatment. Next, the semiconductor film 231 is formed by selectively injecting impurities into the polysilicon film. Here, since the surface in the Z1 direction of the second insulating film 222 overlapping the first groove portion 211, the concave portion 221*r*, and the concave portion 241*r* is the flat surface, the occurrence of unevenness in the semiconductor film 231 formed on the second insulating film 222 due to the effect of the first groove portion 211 is reduced.

As described above, according to the electro-optical device and the recording method according to the embodiment, the following effects can be obtained.

The liquid crystal device 100 according to the embodiment is provided with the capacitance element 26, the first insulating film 221, as an insulating film, that covers the capacitance element 26 and includes the concave portion 221*r* as the recessed portion having the shape reflecting the shape of the capacitance element 26, and the scanning line 241 as the light shielding film provided along the recessed portion 221*r*. The recessed portion 221*r* has the curved bottom surface.

In this manner, the liquid crystal device 100 according to the embodiment includes the concave portion 221*r*, as the recessed portion reflecting the shape of the capacitance element 26, on the opposite side from the capacitance element 26, and the concave portion 221*r* of the first insulating film 221 has the curved bottom surface. Then, in the concave portion 221*r* of the first insulating film 221, the scanning line 241 layered on the first insulating film 221 is formed along the curved bottom surface of the concave portion 221*r*, and it is thus possible to suppress the occurrence of a defect in the scanning line 241, such as a line breakage due to a crack, development of high resistance of the wiring resistance, a deterioration in the light shielding performance, and the like. In this way, the liquid crystal device 100 according to the embodiment can improve display quality.

Furthermore, in the liquid crystal device 100 according to the embodiment, the scanning line 241 as the light shielding film includes tungsten or tungsten silicide.

In this manner, the liquid crystal device 100 according to the embodiment can cause the scanning line 241 to function as the light shielding film due to the use of the metal material including tungsten or tungsten silicide in the scanning line 241.

Furthermore, in the liquid crystal device 100 according to the embodiment is provided with the first substrate 21 as the insulating member provided with the capacitance element 26, and the minimum angle, of the angles θ1 formed by the tangent line t1 tangent to the curved bottom surface of the concave portion 221*r* of the first insulating film 221, which is the recessed portion, and the normal line n of the first substrate 21, is not less than 40° and less than 90°.

In this manner, by setting the angle θ1 to be not less than 40° and less than 90°, the liquid crystal device 100 according to the embodiment can suppress the occurrence of defects such as a seam, a crack, a film formation unevenness, or the like, in the scanning line 241 provided on the first insulating film 221.

Furthermore, the liquid crystal device 100 according to the embodiment is provided with the first substrate 21 as the insulating member provided with the capacitance element 26, and the first substrate 21 includes the first groove portion 211 as the second recessed portion overlapping with the first trench capacitance portion 265. The first groove portion 211 and the first trench capacitance portion 265 are provided along the Y direction, which is the first direction, and the scanning line 241 as the light shielding film is provided in the X direction, which is the second direction intersecting the Y direction.

In this manner, in the liquid crystal device 100 according to the embodiment, even when the extending direction of the first groove portion 211 and the extending direction of the scanning line 241 intersect, the occurrence of defects such as a seam, a crack, or a film formation unevenness in the scanning line 241 that intersects the first groove portion 211 can be suppressed. Thus, display defects or a deterioration in display quality resulting from breaking of the scanning line 241, from the development of high resistance in the wiring resistance of the scanning line 241, from a deterioration in the light shielding performance of the scanning line 241, or the like can be suppressed.

Furthermore, the liquid crystal device 100 according to the embodiment is provided with the transistor 23, and the data line 242 extending along the Y direction as the first direction. The transistor 23 includes the semiconductor film 231 provided along the Y direction, and the first trench capacitance portion 265, the first groove portion 211 as the second recessed portion, and the semiconductor film 231 are provided at a position overlapping the data line 242 in plan view.

In this manner, since the first trench capacitance portion 265 and the data line 242 are provided along the same direction as the semiconductor film 231 of the transistor 23, the liquid crystal device 100 according to the embodiment can improve the light shielding performance with respect to the transistor 23.

2. Modified Examples

In each of the above-described embodiments, the active matrix liquid crystal device 100 is illustrated as the liquid crystal device 100, but the liquid crystal device 100 may be a passive matrix type.

Further, the driving method of the liquid crystal device 100 may be either a vertical electric field system or a transverse electric field system. Note that examples of the horizontal electric field system include an in plane switching (IPS) mode. Examples of the vertical electric field system include a twisted nematic (TN) mode, vertical alignment (VA), a PVA mode, and an optically compensated bend (OBD) mode. Further, although the liquid crystal device 100 is a transmissive type, a reflective or liquid crystal on silicon (LCOS) type liquid crystal device may be used.

Further, the electro-optical device according to the embodiment may be used in an organic electro-luminescence (EL) device or in a digital micromirror device (DMD).

3. Electronic Apparatus

The liquid crystal device 100 as the electro-optical device can be used in various types of electronic apparatus.

Figure 22:
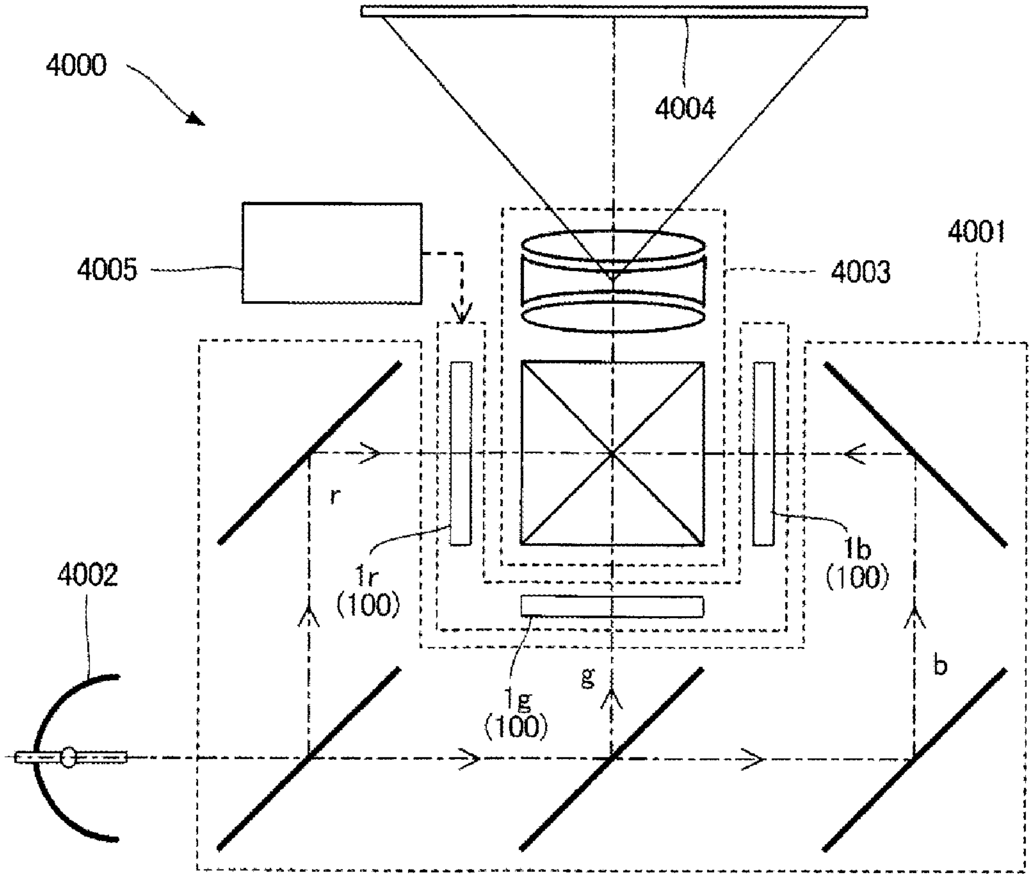
FIG. 22 is a schematic diagram illustrating a projector, which is an example of an electronic apparatus.

FIG. 22 is a schematic diagram illustrating a configuration of a projector, which is an example of the electronic apparatus according to the embodiment. A projection-type display device 4000 is a three-plate type projector, for example, that is provided with three of the liquid crystal devices 100.

An electro-optical device 1*r* is the electro-optical device 100 corresponding to a red display color, an electro-optical device 1*g* is the electro-optical device 100 corresponding to a green display color, and an electro-optical device 1*b* is the electro-optical device 100 corresponding to a blue display color.

A control unit 4005 includes, for example, a processor and a memory, and controls operations of the liquid crystal devices 1*r*, 1*g*, and 1*b*.

Of light emitted from an illumination device 4002, which is a light source, an illumination optical system 4001 supplies monochromatic light of a red color component r to the electro-optical device 1*r*, supplies a monochromatic light of a green color component g to the electro-optical device 1*g*, and supplies monochromatic light of a blue color component b to the electro-optical device 1*b*.

Each of the electro-optical devices 1*r*, 1*g*, and 1*b* functions as an optical modulator, such as a light valve, that modulates the respective monochromatic light supplied from the illumination optical system 4001 in accordance with a display image.

A projection optical system 4003 synthesizes the light emitted from each of the electro-optical devices 1*r*, 1*g*, and 1*b*, and projects the synthesized light onto a projection surface 4004, such as a screen.

As described above, according to the projection-type display device 4000 according to the embodiment, the following effects can be obtained in addition to the effects of each of the above-described embodiments.

The projection-type display device 4000, as the electronic apparatus, is preferably provided with the liquid crystal device 100, as the electro-optical device according to each of the above-described embodiments, and the control unit 4005 that controls operations of the liquid crystal device 100.

According to this configuration, the projection-type display device 4000 includes the above-described liquid crystal device 100, and thus the display quality of the projection-type display device 4000 can be enhanced.

Note that the electronic apparatuses in which the electro-optical device 100 according to the present disclosure is employed are not limited to the example above. Examples of electronic apparatuses in which the electro-optical device 100 is employed include a personal computer, a smart phone, a portable digital assistant (PDA), a digital still camera, a television, a video camera, a car navigation device, an in-vehicle display, an electronic organizer, electronic paper, a calculator, a word processor, a work station, a videophone, a point of sale (POS) terminal, a printer, a scanner, a copier, a video player, equipment provided with a touch panel, and the like.

The present disclosure has been described above based on the preferred embodiments, but the present disclosure is not limited to the embodiments described above. Further, the configuration of each of components of the present disclosure may be replaced with any desired configuration that exerts the equivalent function of the above-described embodiments, or any desired configuration may be added thereto.

What is claimed is:

1. An electro-optical device comprising:

a capacitance element;

an insulating film covering on the capacitance element, and including a first recessed portion reflecting a shape of the capacitance element, wherein the first recessed portion is formed in the insulating film and is recessed toward a side of the insulating film that contacts the capacitance element; and a light shielding film provided on the insulating film alongside the first recessed portion;

an insulating member including a second recessed portion in which the capacitance element is provided, wherein the first recessed portion includes a bottom surface having a curved surface shape, the second recessed portion overlaps the first recessed portion, the first recessed portion and the second recessed portion are provided along a first direction, and the light shielding film is provided along a second direction intersecting the first direction.

2. The electro-optical device according to claim 1, wherein the light shielding film includes tungsten or tungsten silicide.

3. The electro-optical device according to claim 1, wherein a minimum angle, of angles formed by a tangent line tangent to the bottom surface having the curved surface shape of the first recessed portion and a normal line of the insulating member, is greater than 40° and less than 90°.

4. The electro-optical device according to claim 1, further comprising:

a transistor; and a data line extending along the first direction, wherein the transistor includes a semiconductor film provided along the first direction, and the first recessed portion, the second recessed portion, and the semiconductor film are provided at a position overlapping the data line in a plan view.

5. An electronic apparatus comprising:

the electro-optical device according to claim 1; and a control unit configured to control an operation of the electro-optical device.

6. An electro-optical device comprising:

an insulating member including a first recessed portion provided along a first direction;

a capacitance element covering on the first recessed portion, and including a second recessed portion reflecting a shape of the first recessed portion;

an insulating film covering on the second recessed portion, and including a third recessed portion reflecting a shape of the second recessed portion; and a light shielding film provided along a second direction intersecting the first direction, and covering on the third recessed portion, wherein the third recessed portion is recessed toward a side of the insulating film that contacts the capacitance element and includes a bottom surface having a curved surface shape, a recess direction of the first recessed portion, the second recessed portion and the third recessed portion is the same as a direction in which the insulating member, the capacitance element, the insulating film, and the light shielding film are sequentially provided, and the bottom surface of the third recessed portion is a surface in contact with the light shielding film.

7. The electro-optical device according to claim 6, wherein the insulating member further includes a fourth recessed portion provided along the second direction and disposed apart from the first recessed portion, the capacitance element covers on the fourth recessed portion, and further includes a fifth recessed portion reflecting a shape of the fourth recessed portion, the insulating film covers on the fifth recessed portion, and further includes a sixth recessed portion reflecting a shape of the fifth recessed portion, and the light shielding film covers on the sixth recessed portion.

8. An electro-optical device comprising:

an insulating member including a first recessed portion provided along a first direction;

a capacitance element covering on the first recessed portion, and including a second recessed portion reflecting a shape of the first recessed portion;

an insulating film covering on the second recessed portion, and including a third recessed portion reflecting a shape of the second recessed portion; and a light shielding film provided along a second direction intersecting the first direction, and covering on the third recessed portion, wherein the third recessed portion is recessed toward a side of the insulating film that contacts the capacitance element and includes a bottom surface having a curved surface shape, the insulating member further includes a fourth recessed portion provided along the second direction and disposed apart from the first recessed portion, the capacitance element covers on the fourth recessed portion, and further includes a fifth recessed portion reflecting a shape of the fourth recessed portion, the insulating film covers on the fifth recessed portion, and further includes a sixth recessed portion reflecting a shape of the fifth recessed portion, and the light shielding film covers on the sixth recessed portion.

* * * * *